L. W. THOMPSON.
Safety-Pinion for Watches.

No. 165,275.

Patented July 6, 1875.

WITNESSES
Villette Anderson.
George E. Upham.
V.A. del!

INVENTOR
Lyman W. Thompson

BY Chipman Hosmer & Co
ATTORNEYS

N. PETERS, PHOTO-LITHOGRAPHER, WASHINGTON, D.C.

UNITED STATES PATENT OFFICE.

LYMAN W. THOMPSON, OF CHERRY VALLEY, NEW YORK.

IMPROVEMENT IN SAFETY-PINIONS FOR WATCHES.

Specification forming part of Letters Patent No. 165,275, dated July 6, 1875; application filed April 25, 1874.

*To all whom it may concern:*

Be it known that I, LYMAN W. THOMPSON, of Cherry Valley, in the county of Otsego and State of New York, have invented a new and valuable Improvement in Watch-Pinions; and I do hereby declare that the following is a full, clear, and exact description of the construction and operation of the same, reference being had to the annexed drawings, making a part of this specification, and to the letters and figures of reference marked thereon.

Figure 1:
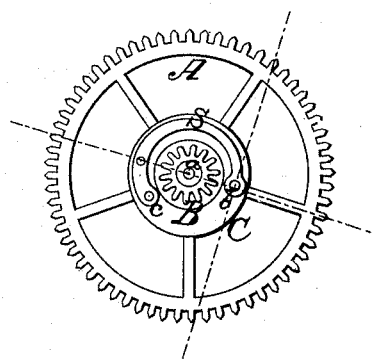
Figure 2:
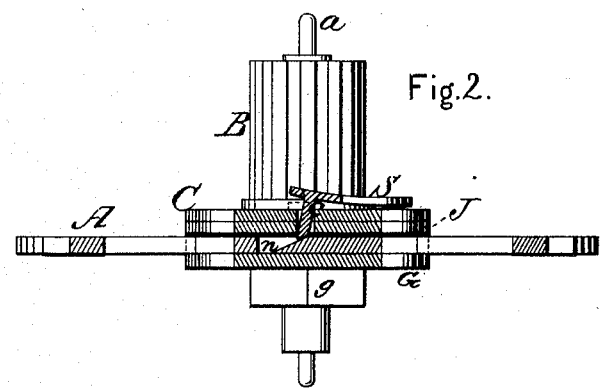
Figure 3:
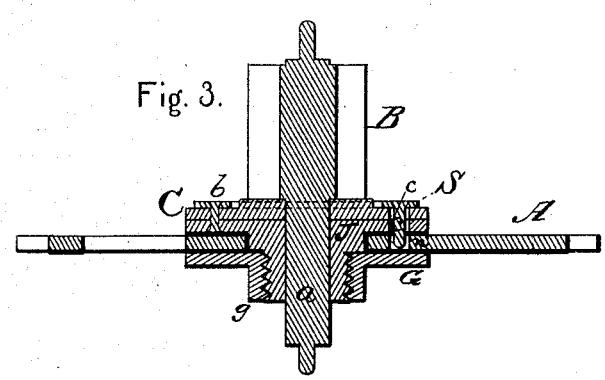

Figure 1 of the drawing is a representation of a side elevation of my watch-pinion, and Figs. 2 and 3 are sectional views.

This invention has relation to the "third-wheel pinions" of watches; and it consists in the construction and novel arrangement of the flanged hub at the base of the pinion, said hub and pinion being in fixed relation to the pinion-post; the third wheel, loosely placed on said hub and provided with a chamfered notch, and the curved flat spring carrying the latch-pin, all as hereinafter more fully described.

The object of this invention is to provide a compact and reliable safety-pinion, which, while the parts are kept in their relative position, will allow the third wheel to turn freely on the hub, should the main spring break. It is designed to introduce this improvement without increasing the thickness of the works, a thin watch being preferred in trade.

In the annexed drawings, A designates a third wheel; B, the pinion; and $a$, the pinion-post. I drive a piece of metal on the post $a$, and then turn this piece down, so as to form a hub or shoulder, J, for the support of the wheel A, on which hub is a circular flange equal in diameter to the center or hub of wheel A. C designates a circular plate, having a spring, S, secured to it at $b$, the free end of which spring has a latching-pin, $c$, secured to it, which passes freely through the plate C, through the flange of hub J, and enters a recess, $n$, made into the wheel A. The recess $n$ presents a square shoulder and a beveled end, as shown in Fig. 2. The wheel A is held in its place to the hub J by means of a nut, G, having a prismatic portion, $g$, formed on it.

As long as the mainspring of the watch remains unbroken the latch-pin $c$ will bear against the square shoulder of the recess $n$, and engage the wheel with the post $a$. Should the mainspring break, the pin $c$ will pass out of the recess $n$, and allow the pinion-post to revolve loosely.

What I claim as new, and desire to secure by Letters Patent, is—

The safety-pinion herein described, consisting of the shaft $a$, the pinion B, the flanged and threaded hub J, and screw-cap G, all rigidly connected, the flat curved spring S carrying the latch-pin $c$, and the loose wheel A seated on said hub, and having the chamfered notch $n$, all constructed and arranged as specified.

In testimony that I claim the above I have hereunto subscribed my name in the presence of two subscribing witnesses.

LYMAN W. THOMPSON.

Witnesses:
AVERY JAY THOMPSON,
WILLIAM V. S. BASTIAN.